United States Patent
Voice et al.

(10) Patent No.: US 8,821,785 B2
(45) Date of Patent: Sep. 2, 2014

(54) JOINING AND A REPAIR METHOD

(75) Inventors: Wayne E. Voice, Nottingham (GB); Thomas P. Jarvis, Derby (GB); Junfa Mei, Birmingham (GB)

(73) Assignee: Rolls-Royce PLC, London (GB)

( * ) Notice: Subject to any disclaimer, the term of this patent is extended or adjusted under 35 U.S.C. 154(b) by 671 days.

(21) Appl. No.: 12/451,385

(22) PCT Filed: May 23, 2008

(86) PCT No.: PCT/GB2008/001797
§ 371 (c)(1),
(2), (4) Date: Nov. 10, 2009

(87) PCT Pub. No.: WO2009/001026
PCT Pub. Date: Dec. 31, 2008

(65) Prior Publication Data
US 2010/0129255 A1 May 27, 2010

(30) Foreign Application Priority Data
Jun. 22, 2007 (GB) .................................. 0712103.1

(51) Int. Cl.
*B22F 7/00* (2006.01)
(52) U.S. Cl.
USPC ............................................. 419/9; 228/165
(58) Field of Classification Search
USPC ...................................... 228/119, 165; 419/9
IPC .......................................... B22F 1/0059,7/062
See application file for complete search history.

(56) References Cited

U.S. PATENT DOCUMENTS

| | | | |
|---|---|---|---|
| 4,008,844 A | 2/1977 | Duvall et al. | |
| 5,071,054 A | 12/1991 | Dzugan et al. | |
| 5,156,321 A * | 10/1992 | Liburdi et al. | 228/119 |
| 5,182,080 A | 1/1993 | Beltran et al. | |
| 5,873,703 A | 2/1999 | Kelly et al. | |
| 2005/0036898 A1* | 2/2005 | Sweetland | 419/6 |

FOREIGN PATENT DOCUMENTS

| | | |
|---|---|---|
| EP | 1 293 286 A2 | 3/2003 |
| EP | 1 623 787 A1 | 2/2006 |
| EP | 1 702 709 A1 | 9/2006 |

OTHER PUBLICATIONS

Search Report issued for International Application No. PCT/GB2008/001797 on Aug. 27, 2008.
Written Opinion issued for International Application No. PCT/GB2008/001797 on Aug. 27, 2008.
Search Report issued for British Application No. 0712103.1 on Oct. 9, 2007.

\* cited by examiner

*Primary Examiner* — Weiping Zhu
(74) *Attorney, Agent, or Firm* — Oliff PLC

(57) ABSTRACT

A method of forming a fully consolidated joint between first and second components comprising the steps of forming a slot in the first component; inserting at least part of the second component into the slot; inserting a powder material into the slot; heating the powder material to form a pressure tight skin; and applying hot isostatic pressure to the pressure tight skin to form a fully consolidated joint. Also a method of repairing a component.

19 Claims, 2 Drawing Sheets

JOINING AND A REPAIR METHOD

The present invention relates to a joining method and a repair method and is more particularly related to forming components by joining component parts by diffusion bonding. It finds particular application in joining components to form components of a gas turbine engine in which the joints must be of high integrity. However, it is also applicable to diverse other applications.

There are many industries in which it is necessary to produce relatively complex components having good mechanical properties but that are relatively cheap, produce little waste material and have a low scrap rate in production. Such components may be components for a gas turbine engine, such as an impeller for a centrifugal compressor or an integrally bladed disc (known as a blisk) for a compressor or turbine stage.

Typically such components are machined from wrought material. Whilst machining from a wrought material block provides a component with good mechanical properties, it can result in large amounts of material being machined away as waste. Furthermore, to produce complex shapes, particularly having tight tolerances, may require considerable machining time and/or complex tooling to achieve the desired profiles.

An alternative conventional method of producing such components is by casting, which produces less waste material than machining from wrought. Complex components may require additional protrusions to assist in supporting the component and controlling material distribution during the casting process. Therefore, cast components may require subsequent machining to remove these additional protrusions. Nevertheless there is less material wastage, and hence expense, in casting complex components than in machining from wrought. However, one problem with this method is that casting is a relatively lengthy process since a sacrificial mould must be formed, the molten material inserted into the mould, the mould and molten material slowly cooled and then the mould removed.

Another problem with casting is that the mechanical properties of a cast component are relatively poor due to porosity caused by entrapped gases and shrinkage, inhomogeneous structure, inclusions and segregation within the component. The component is also prone to significant shrinkage due to the large thermal expansion coefficient during the liquid to solid phase change. In most cases this leads to a requirement for the casting to be larger than the desired end component size. The poor mechanical properties may make castings unsuitable for some applications, especially those in fatigue situations, or lead to a high scrap rate in production due to the high product integrity required.

The present invention seeks to provide a method of forming components that seeks to address the aforementioned problems.

Accordingly the present invention provides a method of forming a joint between first and second components, the method comprising the steps of:
 forming a slot in the first component, sized to receive at least part of the second component;
 inserting at least part of the second component into the slot in the first component;
 inserting a powder material into the slot in the first component, the powder material comprising a parent material and a braze alloy including a melting point depressant;
 heating the powder material in a vacuum to form a pressure tight skin; and
 applying hot isostatic pressure to the pressure tight skin to form a fully consolidated joint.

The steps of the method may be repeated for additional first and second components to form a component. Preferably the component is an impeller; the first component is a hub and the second component is a blade. Alternatively the component is a blisk; the first component is a disk or drum and the second component is a blade.

In another aspect the present invention provides a method of repairing a component, the method comprising the steps of:
 forming a slot in the component covering the area requiring repair;
 inserting a powder material into the slot in the first component, the powder material comprising a parent material and a braze alloy including a melting point depressant;
 heating the powder material in a vacuum to form a pressure tight skin; and
 applying hot isostatic pressure to the pressure tight skin to form a fully consolidated repair.

Preferably each of the first and second components comprises one of the group comprising titanium, titanium alloy, nickel and nickel alloy.

Preferably the powder material includes a binder. Preferably the method further comprises, prior to the heating step, the step of debinding the powder material to remove the binder.

Preferably the slot is radiused.

Preferably the parent material comprises substantially the same material as at least one of the first and second components. Preferably the parent material of the powder material is inserted into the slot and subsequently the braze alloy including the melting point depressant of the powder material is inserted into the slot on top of the parent material.

Alternatively the parent material and braze alloy including the melting point depressant are mixed prior to insertion into the slot. Preferably the heating step is liquid phase sintering.

Preferably the heating step occurs at a temperature of 0.6 $T_M$ of the parent material.

Preferably the braze alloy comprises one of the group comprising titanium-copper, titanium-nickel and titanium-copper-nickel.

Preferably the binder comprises one or more of the group comprising a wax and a polymer.

Preferably the powder material comprises less than 10 wt % braze alloy. More preferably the powder material comprises less than 6.5 wt % braze alloy.

Preferably the method further comprises, after the hot isostatic pressing step, the step of machining the pressure tight skin to remove the unwanted braze alloy and to form the desired joint profile.

The present invention will be more fully described by way of example with reference to the accompanying drawings, in which.

Figure 1:
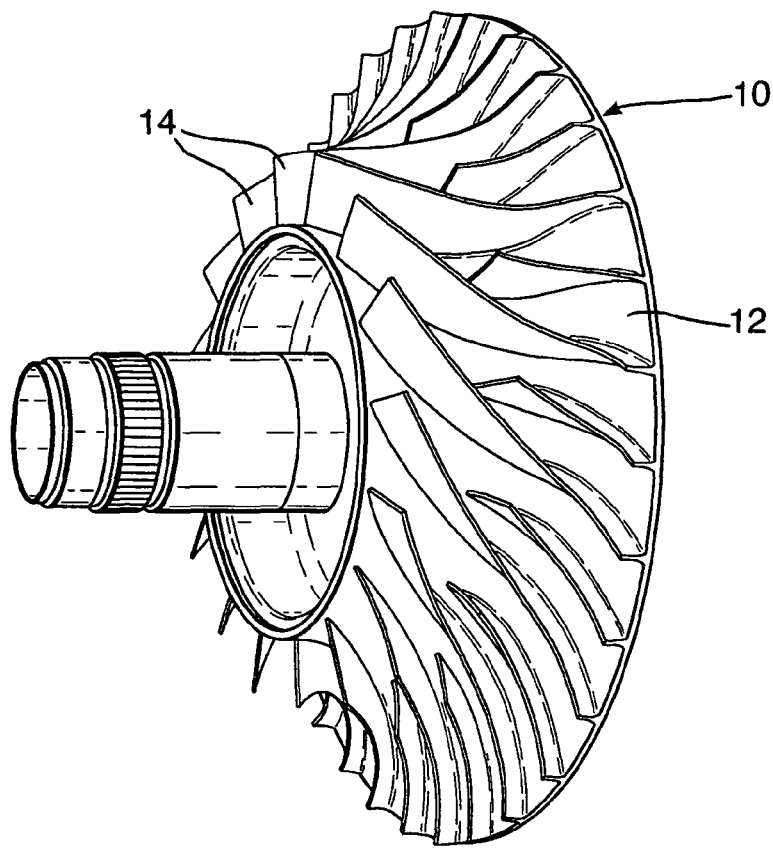
FIG. 1 is a perspective drawing of an impeller manufactured in accordance with the method of the present invention.

The method of the present invention can be used to form complex components for use in many industries. One example is the construction of an impeller 10 for a gas turbine engine, as shown in FIG. 1. The impeller 10 is formed as a hollow, frustoconical hub 12 having a plurality of blades 14 annularly arrayed on the outer surface of the hub 12. Each blade 14 is a substantially right-angled triangle tapering from one end and vertically truncated before meeting the base at the other end. The blades 14 have substantially constant width. The blades 14 are attached to the hub 12 in a complex shape, being curved around the axis of symmetry of the hub 12 such that the taller end of each blade 14 is affixed to the narrowest edge of the outer surface of the hub 12 and the shorter end of each blade 14 is affixed to the widest edge of the outer surface of the hub 12 and is circumferentially displaced from the other end. The hub 12 may typically be produced by hot isostatically pressing powder or by forging, preferably from titanium, nickel, titanium alloy or nickel alloy; the blades 14 may be formed from sheet material, preferably comprising titanium, nickel, titanium alloy or nickel alloy. In a preferred embodiment the hub 12 and blades 14 comprise the same material. However, in other embodiments they may comprise different materials.

Figure 2:
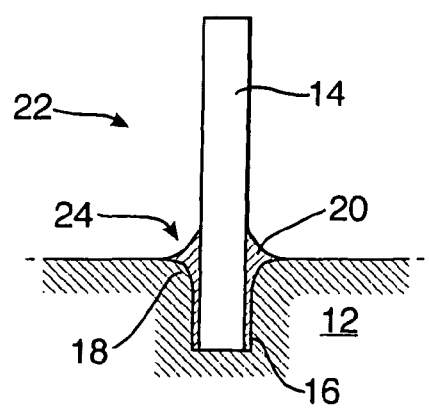
FIG. 2 is a schematic side view of an assembly according to a first embodiment of the method of the present invention.

An exemplary embodiment of the method of the present invention is shown in FIG. 2 in which a part of the hub 12 is shown in section. The hub 12 includes a slot 16 into which a blade 14 is inserted. The slot 16 extends axially and is shaped to follow the desired profile of the blade 14 as seen in FIG. 1. The slot 16 width is somewhat larger than the blade 14 so that there is a clearance provided. The slot 16 also includes a radius 18 between the vertical walls of the slot 16 and the outer surface of the hub 12. The clearance of the blade 14 in the slot 16, and the radius 18 of the slot 16, is beneficial for several reasons. Firstly, the blade 14 can be easily inserted into the slot 16, which makes assembly simpler and quicker. This also has the advantage that any variations in the shape of the blade 14 formed from sheet can be accommodated as the blade 14 is inserted into the slot 16. The natural elasticity of the sheet blade material allows it to be pushed into the slot 16 and held in position, even if it is slightly out of shape. Secondly, the radius 18 acts as a guiding feature whilst the blade 14 is inserted into the slot 16, also improving the assembly procedure. Thirdly, the radius 18 ensures there are no sharp edges that might damage the blade 14 or hub 12 during assembly.

The clearance around the blade 14 in the slot 16 provides a small cavity around the base of the blade 14. In the second step of the method of the present invention a powder material 20 is inserted into the slot 16 around the blade 14. In a preferred embodiment, the powder 20 substantially comprises the same material as the hub 12, the blades 14 or the hub 12 and blades 14, called the parent material. The powder 20 further comprises a small proportion of braze alloy including a melting point depressant, which acts to depress the melting point of the parent material. In preferred embodiments the braze alloy including the melting point depressant is titanium-copper, titanium-nickel or titanium-copper-nickel. The braze alloy including the melting point depressant comprises less than 10 wt % of the powder 20 and preferably less than 6.5 wt %. The powder 20 fills the cavity surrounding the blade 14 in the slot 16, fills the radius 18 and may be slightly heaped above the radius 18 to assist in forming a fillet radius after hot isostatic pressing. The powder 20 is generally fine and the hub 12 may be shaken during addition of the powder 20 to improve the packing density in the slot 16. This improves the integrity of the finished joint.

The powder 20 may further comprise a binder, comprising a wax, a polymer or a mixture of both. This helps to retain the powder 20 in the slot 16 and therefore enables a more efficient application of the method of the present invention since several blades 14 can be simultaneously inserted into their respective slots 16 around the hub 12. The powder 20 can be inserted into each slot 16 around the blade 14 and the binder prevents the powder 20 from pouring out of the slot 16 when the assembly 22 is rotated so that the blade 14 is away from the vertically upward position shown in FIG. 2. If the binder is included in the powder 20, the next step in the method of the present invention is to heat the assembly 22 to a sufficient temperature to debind the binder from the powder 20. Preferably this occurs in the same vacuum oven, kiln or furnace as is used for the subsequent steps of the method, described hereinafter. A typical aqueous binder comprises 7 vol % polyvinyl alcohol, 3.5 vol % gelatine agent, 2 vol % paraffin wax and 41.5 vol % water and will comprise 54 vol % of the bound powder 20. Thus powder loading is 46 vol %. The debinding step thus takes place in three stages: at a temperature of 80° C. for 1 hour, 120° C. for 1 hour and finally 500° C. for 2 hours. Alternative binders may be substituted with equal felicity, for example comprising more wax than polymer. Other levels of powder loading are also possible, between 15 vol % and 60 vol % as is well known in the art.

The next step of the method, following either the powder 20 insertion step or the debind step as appropriate, is to liquid phase sinter the powder 20 in the slot 16 to form a joint that is at least 95% dense and thus suitable for hot isostatic pressing (HIPing). Without the addition of the braze alloy including the melting point depressant, sintering to high density typically requires a temperature of around 0.75 $T_M$ (melting point of parent material) for a period of several hours. With the addition of the braze alloy of the present invention a pressure tight skin is formed during the liquid phase sintering at a temperature just above the solidus temperature of the braze alloy, typically around 0.6 $T_M$, for less than 1 hour. For Titanium-6Al-4V, liquid phase sintering is conducted at around 950° C. As stated above, the liquid phase sintering takes place in the same vacuum oven, kiln or furnace as the debind step so that there is no requirement to cool, move and reheat the assembly 22 and the vacuum is maintained. This provides a more lean manufacturing process. The same vacuum oven, kiln or furnace is preferably used for the HIP step described below. Alternatively, however, the assembly can be cooled and moved to another oven, kiln or furnace.

Figure 3:
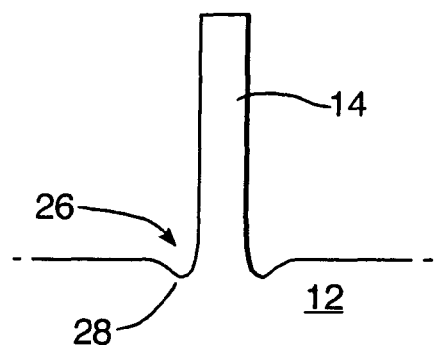
FIG. 3 is a schematic side view of a fully consolidated joint produced according to the method of the present invention.

The final major step in the method of the present invention is HIPing. The assembly 22 is subjected to simultaneous heat and isostatic pressure to fully consolidate the joint 24. This must be done at a temperature below the solidus of the service joint where it still has sufficient strength to transfer the isostatic pressure. For Titanium-6Al-4V HIPing typically occurs at 920° C. and 200 Mpa for 2 hours. This produces the fully consolidated joint 26, with no distinguishable joint line, shown in FIG. 3. There is at least one radius 28 formed between the blade 14 and the hub 12, which reduces stress in the joint 26. Typically the radii 28 will be in the form of 2 mm fillets. However, the size and shape of the radii 28 is dependent upon the size of the components 12, 14 being joined, the materials used for the components 12, and the joint 20, and the stress anticipated in the operating environment of the finished component 10.

Subsequent to the steps described above it may be necessary to machine the joint 26 to improve its shape, particularly the radii 28, and/or to remove some or substantially all of the braze alloy from the joint 26. The powder 20, which includes the braze alloy, occupies only a relatively small volume of the joint 26. This ensures that the fully consolidated joint 26 has substantially the same properties as the components 12, 14 that are joined. This, combined with the stress reducing radii 28, ensures an integral structure with the mechanical properties of a component that is machined from wrought, with the minimal waste of a cast component and without fatigue limiting defects.

Figure 4:
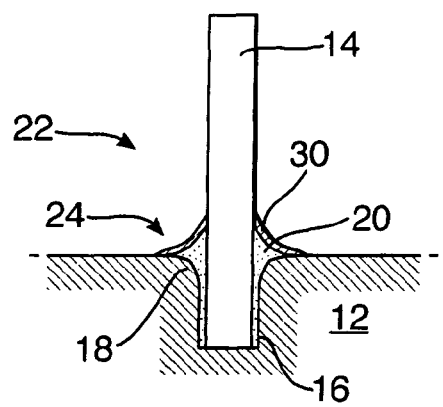
FIG. 4 is a schematic side view of an assembly according to a second embodiment of the method of the present invention.

A second embodiment of the method of the present invention is shown in FIG. 4 in which a hub 12 and a blade 14 are assembled. A slot 16 is formed in the hub 12 as before, having a radius 18 between each vertical side of the slot 16 and the outer surface of the hub 12. Powder 20 is again added into the slot 16 around the base of the blade 14. However, the powder 20 does not include any braze alloy. Instead a separate layer of braze alloy including a melting point depressant 30, which may include a binder as previously described to hold the braze alloy 30 in place, is added after the powder 20. The braze alloy may be titanium-copper-nickel (TiCuNi) or a suitable alternative.

The debinding step, as described with respect to the first embodiment, may take place at this stage of the method. This removes the binder, if used, from the braze alloy 30. The assembly 22 is then heated, in the same vacuum oven, kiln or furnace as used for the debind step, at 950° C. (between the liquidus and solidus temperature of the braze alloy) for 10 minutes. A pressure tight skin is thus formed. The advantage of this second embodiment of the method is the short holding time at high temperature which means that there is limited time for diffusion and contamination of the joint. In this embodiment, the heating step has the effect of forming a pressure tight skin adjacent the upper surface of the powder 20, formed by the consolidation of the braze alloy layer 30. This provides a resistive layer suitable for the application of pressure in the subsequent HIP step. The pressure tight skin may be considered a "service joint" since it is disposable and may be machined away from the fully consolidated joint 26.

The application of the braze alloy layer 30 may be preferable to the inclusion of a small proportion of the braze alloy within the powder 20 since it ensures that the fully consolidated joint consists only of the powder material, which is preferably the same as the hub 12 and blade 14. This means that there is little or no difference in mechanical properties between the originally formed components 12, 14 and the joint. Due to the short time for diffusion, there is little diffusion between layer 30 and the fully consolidated joint 26. It is thus possible to cleanly machine away all the braze alloy including the melting point depressant 30 to leave the correctly formed joint 26.

The shape of the radius 28 formed in the fully consolidated joint 26 between the blade 14 and the hub 12 is at least partly determined by the shape of the radius 18 of the slot 16. This is because the HIP step reduces the volume of the powder 20, and therefore deforms the heaped powder 20 into a consolidated shape, by eliminating internal voids and porosity. The provision of the loose tolerance fit slot 16 and the radius 18 at its upper extent guides the deformation as the powder 20 consolidates so that the powder 20 preferentially shrinks into the slot 16 to ensure there is close to 100% density achieved within the joint 26.

Figure 5:
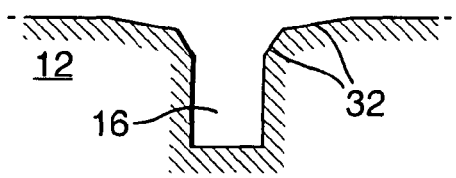
FIG. 5 is a schematic side view of an alternative arrangement of a slot in a component used in the method of the present invention.

Although it is preferable, as described above, to provide a radius 18 at the upper extent of the slot 16, many of the advantages derived from the invention are equally obtained by providing a right-angled intersection between the slot 16 and the outer surface of the hub 12. Similarly, although a fillet radius 18 is preferred, other types of shaped joint are possible; for example, one or more flat, angled planes 32 (as shown in FIG. 5) may define the transition between the side of the slot 16 and the upper surface of the hub 12.

Although it has been described that the braze alloy layer of the second embodiment is machined away it may be removed by another method, for example acid etching, chemical milling or shot blasting.

Although the method of the present invention has been described with reference to the construction of an impeller for a gas turbine engine it can equally be applied to joining other components for a gas turbine engine. For example, it may be used to join blades to a disc or drum to form an integrally bladed disc (blisk) or drum (blum) suitable for use in a compressor or turbine stage. Alternatively it may be used to join components in other industries where complex components are required with good mechanical properties.

Although the method of the present invention has been described with reference to joining two component parts together, it is equally applicable to repairing a component. In this case a crack is cleaned of contaminants and surface oxides and filled with a powder as described in previous embodiments. The method then progresses as before with the steps of heating to form a pressure tight layer and subsequent hot isostatic pressing. Optionally, excess material can then be machined away.

The invention claimed is:

1. A method of forming a joint between first and second components, the method comprising the steps of:
    a) forming a slot in the first component, sized to receive at least part of the second component;
    b) inserting at least part of the second component into the slot in the first component;
    c) inserting a powder material into the slot in the first component, the powder material comprising a parent material and a braze alloy including a melting point depressant;
    d) sintering the powder material in a vacuum at a single temperature to form a pressure tight skin, wherein the sintering consists of liquid phase sintering; and
    e) applying hot isostatic pressure to the pressure tight skin to form a fully consolidated joint,
    wherein the method of forming the joint includes only one sintering step, that sintering step being step d).

2. The method of claim 1, wherein the steps a) to e) are repeated for additional first and second components to form a further component.

3. The method of claim 2, wherein the further component is an impeller.

4. The method of claim 3, wherein the first component is a hub.

5. The method of claim 3, wherein the second component is a blade.

6. The method of claim 1, wherein each of the first and second components comprises one of the group consisting of titanium, titanium alloy, nickel, and nickel alloy.

7. The method of claim 1, wherein the powder material includes a binder.

8. The method of claim 7, wherein the method further comprises, prior to the sintering step, a step of debinding the powder material to remove the binder.

9. The method of claim 7, wherein the binder comprises one or more of the group comprising a wax and a polymer.

10. The method of claim 1, wherein the slot is radiused.

11. The method of claim 1, wherein the parent material comprises substantially the same material as at least one of the first and second components.

12. The method of claim 1, wherein the parent material of the powder material is inserted into the slot and subsequently the braze alloy including the melting point depressant of the powder material is inserted into the slot on top of the parent material.

13. The method of claim 1, wherein the parent material and braze alloy including the melting point depressant are mixed prior to insertion into the slot.

14. The method of claim 1, wherein the sintering step occurs at a temperature of 0.6 $T_m$ of the parent material.

15. The method of claim 1, wherein the braze alloy including the melting point depressant comprises one of the group consisting of titanium-copper, titanium-nickel, and titanium-copper-nickel.

16. The method of claim 1, wherein the powder material comprises less than 10 wt % braze alloy including the melting point depressant.

17. The method of claim 1, wherein the powder material comprises less than 6.5 wt % braze alloy including the melting point depressant.

18. The method of claim 1, wherein the method further comprises, after the step of applying hot isostatic pressure, a step of machining the pressure tight skin to remove the pressure tight skin.

19. A method of repairing a component, the method comprising the steps of:
a) forming a slot in the component covering the area requiring repair;
b) inserting a powder material into the slot in the component, the powder material comprising a parent material and a braze alloy including a melting point depressant;
c) sintering the powder material in a vacuum at a single temperature to form a pressure tight skin, wherein the sintering consists of liquid phase sintering; and
d) applying hot iso static pressure to the pressure tight skin to form a fully consolidated repair,
wherein the method of repairing the component includes only one sintering step, that sintering step being step c).

* * * * *